United States Patent [19]

Harbin

[11] Patent Number: 5,454,985
[45] Date of Patent: Oct. 3, 1995

[54] PAINT STRIPPING COMPOSITION

[75] Inventor: Raymond H. Harbin, Livonia, Mich.

[73] Assignee: Gage Products Company, Ferndale, Mich.

[21] Appl. No.: 172,861

[22] Filed: Dec. 23, 1993

Related U.S. Application Data

[63] Continuation of Ser. No. 972,631, Nov. 6, 1992, abandoned.

[51] Int. Cl.$^6$ .................. C11D 3/20; C11D 1/22; C11D 7/26; C09D 9/04
[52] U.S. Cl. .................. 252/558; 252/143; 252/158; 252/162; 252/170; 252/173; 252/171; 252/DIG. 8; 134/38
[58] Field of Search .................. 252/143, 158, 252/558, 162, 170, 173, 171, DIG. 8; 134/38

[56] References Cited

U.S. PATENT DOCUMENTS

| | | | |
|---|---|---|---|
| 3,616,803 | 11/1971 | Menkart | 252/139 |
| 4,024,085 | 5/1977 | Kobayashi et al. | 252/170 X |
| 4,120,810 | 10/1978 | Palmer | 252/153 |
| 4,199,482 | 4/1980 | Renaud et al. | 252/171 |
| 4,414,128 | 11/1983 | Goffinet | 252/171 |
| 4,445,939 | 5/1984 | Hodson | 134/38 |
| 4,559,150 | 12/1985 | Becker et al. | 252/8.6 |
| 4,576,738 | 3/1986 | Colodney et al. | 252/170 X |
| 4,732,695 | 3/1988 | Francisco | 252/162 |
| 4,822,723 | 4/1989 | Dhillon | 252/170 |
| 4,909,962 | 3/1990 | Clark | 252/547 |
| 4,980,271 | 12/1990 | Hsieh et al. | 430/309 X |
| 5,015,410 | 5/1991 | Sullivan | 252/170 |
| 5,035,982 | 7/1991 | Walls | 430/309 X |
| 5,051,212 | 9/1991 | Culshaw et al. | 252/170 |
| 5,080,822 | 1/1992 | Van Eenam | 252/170 |
| 5,080,831 | 1/1992 | Van Eenam | 252/558 |
| 5,081,003 | 1/1992 | Dhillon | 430/309 |

FOREIGN PATENT DOCUMENTS

| | | | |
|---|---|---|---|
| 497130 | 8/1992 | European Pat. Off. | |
| 3902748 | 8/1990 | Germany | |
| 2167083 | 5/1986 | United Kingdom | 252/542 |

OTHER PUBLICATIONS

Chemical Abstracts, accession No. 114: 65197, ES 2,008, 593, 16 Jul. 1989.

*Primary Examiner*—Paul Lieberman
*Assistant Examiner*—Douglas J. McGinty
*Attorney, Agent, or Firm*—Gifford, Krass, Groh, Sprinkle, Patmore, Anderson & Citkowski

[57] ABSTRACT

The paint stripping composition comprises by weight: 30 to 65% benzyl alcohol and 20 to 60% water together with a coupling agent which operates to solubilize the benzyl alcohol in the water.

6 Claims, No Drawings

5,454,985

PAINT STRIPPING COMPOSITION

This is a continuation of application Ser. No. 07/972,631 filed on Nov. 6, 1992, now abandoned.

FIELD OF THE INVENTION

This invention relates generally to paint stripping compositions.

BACKGROUND OF THE INVENTION

Paint strippers are important industrial chemicals and are used both in the finishing of manufactured articles and in the clean-up of painting facilities. Paint strippers are used in particularly large volumes in the automotive industry for cleaning paint spray booths and material handling equipment.

The threshold requirements for a good paint stripping composition are that it provides quick stripping action and that it does not harm the parts being stripped. It is also quite important that a paint stripping composition, particularly one used in large volumes by industry, be non-hazardous and of low toxicity to both animal and plant life so as to minimize any potential harm and costs associated with its disposal and handling. Toward that end, the stripper should be of fairly low volatility and flammability and preferably should be non-flammable. It is also desirable that the paint stripping composition be either soluble or dispersible in water so as to facilitate the rinsability of stripped parts. Finally, it is important that any stripping composition be of low cost and/or readily recoverable for reuse.

There are a large number of paint stripping compositions which are known in the prior art; however, the prior art is still deficient in providing the paint stripping compositions which meet foregoing criteria. Organic solvents such as benzene, toluene, cyclohexanone, methyl ethyl ketone and mineral spirits as well as halocarbons, such as methylene chloride, have long been used as paint strippers. While certain of such materials do have utility in particular applications, they are not generally applicable to large scale stripping operations because of environmental hazards, flammability and cost. Alkaline materials such as sodium or potassium hydroxide are low cost, effective paint strippers; however, they are inherently dangerous materials and calm damage a variety of substrates. Similar problems hold for acid based strippers. With the technological advent of current paint formulations such as the two (2) component urethanes, water-based base coats, and electrolytically deposited (E-coat) paints, the aforementioned stripper components are often useless.

In an effort to overcome the problems of such prior art stripping materials, industry has turned to blends of particular solvents. Pat. No. 4,120,810 discloses the use of N-methyl pyrrolidone together with a high molecular weight aromatic hydrocarbon for stripping paint. Pat. No. 4,732,695 discloses the use of N-methyl pyrrolidone together with benzyl alcohol and naphtha as a paint stripper. While both of these compositions do provide a material having somewhat lowered hazards, the compositions are fairly expensive and their stripping action is fairly slow.

There is clearly a need for a paint stripping composition which is non-hazardous, low cost and which provides for rapid and thorough stripping action. In accord with the principles of the present invention, it has been found that benzyl alcohol and water combine synergistically to provide a highly effective, low cost, low toxicity paint stripping composition. It is surprising and counter-intuitive that these two materials should cooperate in this manner since benzyl alcohol itself is only moderately effective as a paint stripper and water is a non-solvent for the paint compositions in question. It would thus be expected that the combination, at best, would be worse than benzyl alcohol in terms of stripping action. However, as will be detailed hereinbelow, it has been found that mixtures of benzyl alcohol and water provide a paint stripping composition which is far superior to prior art products and which is low in cost and toxicity. These and other advantages of the present invention will be readily apparent from the discussion, description and examples which follow.

BRIEF DESCRIPTION OF THE INVENTION

There is disclosed herein a paint stripping composition comprising by weight: 30–65% benzyl alcohol, 20–60% water and a coupling agent operative to solubilize the benzyl alcohol in the water. The stripping composition may further include 1–15% by weight of an accelerator compound selected from the group consisting of organic acids, inorganic acids, organic bases, inorganic bases and combinations thereof. In one particular embodiment, the accelerator comprises formic acid, and in another particular embodiment, the coupling agent comprises sodium xylene sulfonate.

In some instances, the coupling agent may be selected from the group consisting of potassium benzoate, 1–4 butanediol, potassium heptanoate, sulfonate salts and combinations thereof. In other embodiments, the stripping composition may include a thickening agent or a surfactant.

DETAILED DESCRIPTION OF THE INVENTION

In accord with the principles of the present invention, it has been found that a mixture of benzyl alcohol and water provides an excellent stripping composition for a large variety of paints, both air-dried and oven-cured, including urethane based paints, acrylic based paints, lacquers, epoxys, and electro-coated paints. The composition tends to swell and lift the paint layer in a sheet like form in a manner similar to methylene chloride and is in contrast to alkaline strippers which digest the paint film. This feature enables ready removal of the paint from the stripper by simple filtration thereby aiding in recovery of the stripper. Additionally, the surface thus provided is quite clean and amenable to further processing.

In general, it has been found that an optimum compositional range for the stripper of the present invention comprises, by weight, 30 to 65% of benzyl alcohol together 20 to 60% of water. Benzyl alcohol is only slightly soluble in water; approximately 1 gram of benzyl alcohol dissolves in 25 milliliters of water at room temperature. Therefore, the composition of the present invention ideally includes a coupler which is operative to solubilize the benzyl alcohol into the water, as will be explained in greater detail hereinbelow. The stripping composition may also include ancillary ingredients such as accelerators for further enhancing the stripping action as well as thickening agents, surfactants and the like.

THE BASE COMPOSITION

As will be further detailed in the comparative examples set forth hereinbelow, the basic stripping composition preferably includes 30 to 65% benzyl alcohol in 20 to 60% water, with all percentages herein being specified on a weight basis. The exact range of water and alcohol will depend upon the nature of the paint being stripped. As noted above, the composition will preferably include a coupling agent for solubilizing the water/alcohol mixture. In the context of the present invention, solubilizing shall refer to any process wherein a miscible mixture of the two components is provided whether they are truly dissolved, suspended or dispersed in a micro emulsion or colloidal form. In general it has been found that the preferred compositions do comprise a clear, stable solution.

THE COUPLING AGENT

There are a wide variety of coupling agents which may be employed in the practice of the present invention. In general, the coupling agents comprise molecules having solubility in both organic and aqueous media. One particularly preferred group of couplers comprises sulfonate salts such as sodium or potassium xylene sulfonate. Naphthalene sulfonate salts can function as coupling agents. Salts of organic acids such as benzoate or heptanoate salts also can function as couplers; although, a number of such materials are not stable in an acid medium and therefore cannot be used in compositions which further include any acidic materials. 1,4-butanediol, 1–5 pentanediol and similar polyhydric alcohols can also function as coupling agents. The amount of coupling agent employed will depend upon the nature of the agent itself as well as the proportions of benzyl alcohol and water employed in the stripper. In general, a coupling agent is employed in a percentage range of 1 to 25%.

ACCELERATORS

It has been found that the stripping ability of the basic water/benzyl alcohol/coupling agent mixture can be further enhanced in particular applications by including an appropriate accelerator therein. The accelerator is typically present in a percentage range of 1 to 15%. The accelerator may, in some instances, comprise a basic material, and it has been found that inorganic materials such a sodium or potassium hydroxide as well as organic bases such as monoethanolamine, triethanolamine and the like can function as accelerators. In other instances, the accelerator may be an acidic material, and formic acid, acetic acid, hydroxyacetic acid and lactic acid are some particularly preferred acidic accelerator materials. Other organic accelerators include erythorbic acid.

ANCILLARY INGREDIENTS

The compositions of the present invention can further include thickeners such as organically modified clays, cellulose gums, polymers and the like, as is well known to those of skill in the art for control of rheological properties. The composition may also include surfactants for enhancing the rinsability of the composition.

COMPARATIVE EXAMPLES

A series of tests were carried out to assess the relative paint stripping ability of a variety of compositions, including those of the present invention. All tests were carried out on zinc phosphated steel samples coated with E-coat paint. Each of the samples was immersed in the noted stripper composition at the noted temperature until the paint film was removed and the table lists the time after which removal of the paint film was noted. For some of the samples the time listed as 9–24 hours; this indicates that the film was removed after overnight soaking. A stripping time shown as greater than 72 hours indicates no stripping action at 72 hours.

| Composition | Stripping time at: | | |
| --- | --- | --- | --- |
|  | 68° F. | 110° F. | 150° F. |
| A | >72 hr | | |
| B | >72 hr | | |
| B-57 | >72 hr | | |
| B-58 | >72 hr | | |
| B-59 | >72 hr | | |
| B-64 | 164 min | | |
| B-65 | 350 min | | |
| B-69 | 386 min | | |
| B-75 | 425 min | | |
| B-76 | 350 min | | |
| B-77 | 350 min | | |
| B-78 | 531 min | | |
| B-103 | 254 min | 14 min | 1 min |
| B-104 | 182 min | 9 min | 1 min |
| B-105 | 141 min | 8 min | 1 min |
| B-106 | 488 min | 30 min | 6 min |
| B-107 | 462 min | 17 min | 3 min |
| B-108 | 410 min | 16 min | 3 min |
| B-109 | 9–24 hrs | 32 min | 6 min |
| B-110 | 9–24 hrs | 20 min | 3 min |
| B-111 | 9–24 hrs | 16 min | 3 min |
| B-91 | 9–24 hrs | 98 min | 12 min |
| B-92 | 9–24 hrs | 46 min | 9 min |
| B-93 | 9–24 hrs | 32 min | 8 min |
| B-96 | 9–24 hrs | 134 min | 15 min |
| B-97 | 9–24 hrs | 46 min | 7 min |
| B-101 | 9–24 hrs | 93 min | 17 min |
| B-114 | 9–24 hrs | 30 min | 3 min |
| B-118 | 9–24 hrs | 27 min | 4 min |
| B-117 | >24 hrs | 63 min | 11 min |

Composition A and Composition B correspond to the compositions set forth in U.S. Pat. 4,732,695 at the table of column 5 therein. Specifically Composition A comprises 30% benzyl alcohol, 1% hydroxy propyl cellulose, of an aromatic hydrocarbon mixture and 17% of N-methyl pyrrolidone together with 1% monoethanolamine and 1% of a wetting agent. Composition B comprised 40% benzyl alcohol, 48% of the aromatic mixture, 10% N-methyl pyrrolidone and 1% surfactant and included no monoethanolamine. Both of these prior art compositions required in excess of 72 hours to remove the paint film. Composition B-57 comprised pure benzyl alcohol. B-58 comprised benzyl alcohol with 2% hydroxyacetic acid and B-59 comprised benzyl alcohol with 5% potassium hydroxide. These three compositions all required more than 72 hours to remove the paint film.

Composition B-64 comprised a base solution 37.5% water, 50% benzyl alcohol, 12.5% sodium xylene sulfonate, 2% of a 90% formic acid solution, with the formic acid concentration being calculated relative to the base solution. Composition B-65 was similar to B-64 except that 2% hydroxyacetic acid was substituted for the formic acid. Composition B-69 was similar to B-64 except that 2% lactic acid was substituted for the formic acid.

Composition B-75 included 57.5% water, 30% benzyl alcohol and 12.5% sodium xylene sulfonate and 2% hydroxyacetic acid. Formula B-76 included 47.5% water, 40% benzyl alcohol and 12.5% sodium xylene sulfonate and 2% hydroxyacetic acid. Composition B-77 included 27.5% water, 60% benzyl alcohol and 12.5% sodium xylene sulfonate and 2% hydroxyacetic acid. Composition B-78 included 17.5% water, 70% benzyl alcohol and 15% sodium xylene sulfonate and 4% hydroxyacetic acid. Composition B-103 included a base solution of 37.5% water, 50% benzyl alcohol, 12.5% sodium xylene sulfonate with 1% formic acid. B-104 was similar to B-103 except that it included 3% formic acid. B-105 was also similar to B-103 except that it included 5% formic acid.

B-106 comprised 37.5% water, 50% benzyl alcohol, 12.5% sodium xylene sulfonate with 1% hydroxyacetic acid. B-107 was similar to B-106 except that it included 3% hydroxyacetic acid and B-108 included 5% hydroxyacetic acid. B-109 comprised 37.5% water, 50% benzyl alcohol, 12.5% sodium xylene sulfonate and 1% lactic acid. B-110 was similar to B-109 but it included 3% lactic acid and B-111 likewise included 5% lactic acid.

B-91 comprised 37.5% water, 50% benzyl alcohol, 12.5% potassium benzoate together with 1% of a 45% aqueous solution of potassium hydroxide. B-92 was similar but for the inclusion of 3% of the potassium hydroxide solution and B-93 likewise included 5% of the potassium hydroxide solution. B-96 comprised 37.5% water, 50% benzyl alcohol and 12.5% potassium heptanoate together with 1% of the potassium hydroxide solution. B-97 was similar to B-96 but it included 3% of the potassium hydroxide solution.

B-101 comprised 37.5% water, 50% benzyl alcohol, 12.5% sodium xylene sulfonate together with 1% of the potassium hydroxide solution. B-114 comprised 37.5% water, 50% benzyl alcohol and 12.5% potassium heptanoate together with 3% of an acidic phosphate ester sold under the trade name of Maphos 33 by the Mazur Chemical Company. Composition B-118 comprised 25% water, 50% benzyl alcohol and 25% 1,4-butanediol together with 5% of hydroxyacetic acid. Formulation B-117 was similar to B-118 except that 5% of the potassium hydroxide solution was substituted for the hydroxyacetic acid.

The table makes clear the advantages of the present invention. It will be seen that the benzyl alcohol-water mixtures are far better than pure benzyl alcohol (Formula B-57) or prior art benzyl alcohol/N-methyl pyrrolidone based compositions (Formulas A and B). Even when accelerator materials such as potassium hydroxide (B-58) or hydroxyacetic acid (B-59) are added to non-aqueous benzyl alcohol, stripping action is still very poor.

The data show that an aqueous mixture of approximately 30 to 65% benzyl alcohol will effectively strip paint, and in the case of the particular paint employed in the experimental series of Table 1, 40 to 60% benzyl alcohol provides the best cleaning action. See for example Samples B-76 and B-77 which are better in cleaning action than corresponding samples B-75 and B-78. The table also shows the effect of various accelerators. For example the addition of relatively small amounts of formic acid enhances cleaning action, see for example Samples B-103–B-105. Likewise, hydroxyacetic acid and lactic acid have similar accelerating effects. Alkaline materials such as potassium hydroxide or organic bases are also demonstrated to enhance cleaning action. The data demonstrates use of a wide range of coupling materials including ionic materials such as sulfonates, salts such as potassium benzoate as well as a diol.

In the next experimental series, the effect of various compositions of the present invention was assessed upon steel panels coated with multiple coats of paint in simulation of a finished automobile product. In the first experiment, a 4 in. by 12 in. phosphated, mild steel panel was coated with an electrocoat primer and subsequently coated with a Dupont high solids acrylic base coat and top coated with a two component urethane manufactured by Akzo Corporation All of the foregoing coatings were oven cured. The painted panel was immersed in a stripper composition (B-15) comprising 25 grams of water, 25 grams of a 50% aqueous potassium heptonoate solution and 50 grams of benzyl alcohol. The solution was heated to 150° F. and the test panel immersed in the solution and maintained under static conditions. Stripping of all coatings occurred within 20 minutes.

In another experimental series panels of zinc phosphate coated mild steel were sprayed with one coat of high solids acrylic base coat manufactured by BASF and subsequently coated with a one component acrylic/melamine clear coat also manufactured by BASF. The coating on the panels averaged about 2 mils in thickness and was baked on for ½ hour at 300° F. A series of stripping solutions were prepared. The first (B-14) comprised 37.5% water, 50% benzyl alcohol and 12.5% potassium benzoate. The second was Formula B-15 as noted above. The third (B-16) comprised 37.5% water, 50% benzyl alcohol and 12.5% sodium xylene sulfonate. The final composition (B-17) comprised 12.5 grams water, 25 grams benzyl alcohol and 12.5 grams of a monoethanolamine heptonoate solution (16% mea, 34% heptanoic acid and 50% water) The solutions were each heated to 150° F. and a coated panel immersed in each. It was found that each of the solutions was effective in removing all of the paint layers within 15 minutes.

A third experimental series was run utilizing the same stripping compositions. The panels in this series comprised zinc phosphate coated mild steel painted with a first layer of metallic, water-borne acrylic paint manufactured by PPG. The metallic paint was baked at 300° F. for 20 minutes and the panels were dipped into an acrylic/melamine clear coat manufactured by BASF and baked at 300° F. for ½ hour. These panels were dipped into the foregoing stripping compositions which were maintained at 150° F. All paint layers were stripped in 15 minutes by all four compositions.

In the foregoing it will be seen that the stripping compositions of the present invention have utility for removing a wide range of commonly encountered automotive paints. It should also be noted that the foregoing compositions did not include any accelerators therein but merely comprised benzyl alcohol, water and the coupling agent. Further enhancements and stripping action could be obtained through the use of accelerators.

In some instances, it is desirable to leave the zinc phosphate coating on steel items and it has been found that the following formulations efficiently remove paint without harming the zinc phosphate: B-14, as previously noted; B-125 which comprises 50 grams of benzyl alcohol, 25 grams of water, 5 grams of formic acid and 25 grams of 1,4 butanediol as well formulation B-128 which comprised 50 grams of benzyl alcohol, 25 grams of water, 25 grams of 1,4 butanediol and 10 grams of lactic acid. In general, B-128 was the most effective in stripping paint without removal of zinc phosphate. The flash point of formulation B-16 noted above, was measured by the closed cup method and found to be 190° F.

In the stripping compositions of the present invention, it has been found that benzyl alcohol and water act synergistically to provide a paint stripping action not achievable by either material on its own. There are a wide variety of compositions which may be formulated in accord with the principles of the present invention; however, it has generally been found that the most effective range of benzyl alcohol is from 30 to 65% by weight and that the concentration of water is in the general range of 20 to 60%. The compositions include a coupler for promoting the miscibility of the benzyl alcohol and water. The coupler may be present in a wide compositional range without significant effect upon the composition, provided it is present in amounts sufficient to provide miscibility of the benzyl alcohol and water and it is not present in amounts so large as to dilute the effect of the stripper. In general, concentrations of 1 to 25% will suffice and more typically concentrations of 5–15% are employed. As noted above, small amounts of accelerators such as acids or bases can greatly enhance the stripping action. Generally, the accelerators are present in a concentration of 1 to 15%; although, larger amounts may occasionally be employed.

It has been found that the compositions of the present invention are useful for stripping both air dried and oven cured paints, and the composition is effective against electro-coat paints, water based paints, high solid paints as well as one and two component automotive clear top coats. The compositions may be utilized at ambient or at elevated temperatures and they may be thickened for use on vertical surfaces. The stripper of the present invention has a low volatility and a very high flash point and is non-corrosive and non-toxic. In operation the stripper behaves in a manner similar to methylene chloride strippers insofar as it swells the paint film breaking the bond between the paint film and the subjacent surface. Paint is not digested in the manner of caustic strippers. The composition may be fabricated to be compatible with a phosphate subcoat or to remove that coat together with the paint, by the addition of acid. The stripper may be easily recycled through well known techniques. For example, the benzyl alcohol can be separated with potassium carbonate and purified by distillation.

In view of the foregoing it will be appreciated that a variety of stripping compositions may be fabricated in accord with the principles of the present invention. The preceding discussion, description and examples are merely meant to illustrate particular embodiments of the invention and are not meant to be limitations on the practice thereof. It is the following claims, including all equivalents, which define the scope of the invention.

I claim:
1. A paint stripping composition consisting of, by weight:
   40 to 65% benzyl alcohol;
   20 to 60% water;
   5 to 15% sodium xylene sulfonate; and
   1 to 15% by weight of an accelerator selected from the group consisting of: organic acids, inorganic acids, organic bases, inorganic bases and combinations thereof.
2. A paint stripping composition as in claim 1 wherein said accelerator consists of 1–10% of formic acid.
3. A paint stripping composition as in claim 1, wherein said accelerator consists of 1–10% hydroxyacetic acid.
4. A paint stripping composition as in claim 1, wherein said accelerator consists of 1–10% of a 45% aqueous solution of potassium hydroxide.
5. A paint stripping composition consisting of by weight:
   40 to 65% benzyl alcohol;
   20 to 60% water; and
   a coupling agent in an amount effective to solubilize the benzyl alcohol in the water; and
   optionally, 1–15% of an accelerator selected from the group consisting of: organic acids, inorganic acids, organic bases, inorganic bases and combinations thereof.
6. A paint stripping composition consisting of by weight:
   40 to 65% benzyl alcohol;
   20 to 60% water; and
   a coupling agent in an amount effective to solubilize the benzyl alcohol in the water; and
   optionally, 1 to 15% of an accelerator selected from the group consisting of: sodium hydroxide, potassium hydroxide, triethanolamine, monoethanolamine, lactic acid, acetic acid, hydroxyacetic acid, and erythorbic acid.

* * * * *